(12) United States Patent
Grosshauser

(10) Patent No.: US 12,163,797 B2
(45) Date of Patent: Dec. 10, 2024

(54) DRIVING USING VIRTUAL REALITY (VR) EMULATING REAL DRIVING OF A ROUTE

(71) Applicant: AUDI AG, Ingolstadt (DE)

(72) Inventor: Frank Grosshauser, San Jose, CA (US)

(73) Assignee: AUDI AG, Ingolstadt (DE)

( * ) Notice: Subject to any disclaimer, the term of this patent is extended or adjusted under 35 U.S.C. 154(b) by 80 days.

(21) Appl. No.: 17/559,203

(22) Filed: Dec. 22, 2021

(65) Prior Publication Data

US 2023/0194293 A1     Jun. 22, 2023

(51) Int. Cl.
*G01C 21/36*     (2006.01)

(52) U.S. Cl.
CPC ..... *G01C 21/3647* (2013.01); *G01C 21/3644* (2013.01); *G01C 21/365* (2013.01)

(58) Field of Classification Search
CPC ............ G01C 21/3647; G01C 21/3644; G01C 21/365
See application file for complete search history.

(56) References Cited

U.S. PATENT DOCUMENTS

| | | | |
|---|---|---|---|
| 11,073,831 B2 | 6/2021 | Jiang et al. | |
| 2016/0240012 A1* | 8/2016 | Gruenler | ............ G01C 21/3602 |
| 2019/0186939 A1 | 6/2019 | Cox et al. | |
| 2020/0081134 A1 | 3/2020 | Wheeler et al. | |
| 2020/0189390 A1* | 6/2020 | Viswanathan | .......... G06V 20/64 |
| 2020/0258480 A1* | 8/2020 | Bronder | ................ G01C 21/365 |
| 2021/0190530 A1* | 6/2021 | Jung | ................ G08G 1/096861 |
| 2021/0207971 A1* | 7/2021 | Kim | ...................... G06V 20/597 |
| 2021/0349459 A1* | 11/2021 | Huang | ...................... G06F 3/00 |

* cited by examiner

*Primary Examiner* — Anne Marie Antonucci
*Assistant Examiner* — Jewel Ashley Kuntz
(74) *Attorney, Agent, or Firm* — Sterne, Kessler, Goldstein & Fox P.L.L.C.

(57) ABSTRACT

Some aspects of this disclosure include apparatuses and methods for detecting objects along a driving route, storing information associated with the detected objects, and using the stored objects and information to assist the driver of a motor vehicle (and/or for automated driving of the motor vehicle) when the motor vehicle is driven along the same driving area. For example, some aspects of this disclosure relate to a method including capturing, using a first sensor, information associated with a route driven by a motor vehicle. The method can further include determining, using a processor and the captured information, whether an object associated with the route and data associated with the object are stored in a memory. In response to determining that the object is stored in the memory, the method can further include displaying the object in a virtual reality (VR) mode using the stored data associated with the object.

19 Claims, 4 Drawing Sheets

DRIVING USING VIRTUAL REALITY (VR) EMULATING REAL DRIVING OF A ROUTE

BACKGROUND

Field

This disclosure generally relates to techniques for detecting objects along a driving route, storing information associated with the detected objects, and using the stored information to emulate driving along the route.

Related Art

When a motor vehicle is driven along a route, different sensors of the motor vehicle can capture different information associated with the route. The captured information can be used to assist the driver of the motor vehicle. Additionally, or alternatively, the captured information can be used for automated driving of the motor vehicle. However, the captured information is not stored and is not used later when the motor vehicle is driven along the same route.

SUMMARY

Some aspects of this disclosure include apparatuses and methods for detecting objects along a driving route and/or a driving area, storing information associated with the detected objects, and using the stored objects and information to assist the driver of a motor vehicle (and/or for automated driving of the motor vehicle) when the motor vehicle is driven along the same driving area. According to some aspects, new trips, new driving routes, and/or new driving areas that intersect the previously recorded driving routes and/or driving area can use the stored information associated with the previously recorded driving routes and/or driving areas. According to some aspects, the stored information can be used as an independent redundant sensor information in addition to other information captured by the sensor(s) of the motor vehicle during the operation of the motor vehicle. According to some aspects, the stored information can be used to generate a virtual reality (VR) mode that can be displayed to the driver of the motor vehicle to further assist the driver.

Some aspects of this disclosure relate to a method including capturing, using a first sensor, information associated with a route driven by a motor vehicle. The method can further include determining, using a processor and the captured information, whether an object associated with the route and data associated with the object are stored in a memory. In response to determining that the object is stored in the memory, the method can further include displaying the object in an augmented reality mode (AR) mode, an augmented virtual reality hybrid mode, or a virtual reality (VR) mode using the stored data associated with the object.

In some aspects, determining whether the object associated with the route is stored in the memory can include determining whether an actual object of the route captured by the first sensor is substantially same as the object stored in the memory.

In some aspects, the method can further include accessing the memory based on the captured information, where the captured information comprises location information associated with one or more landmarks captured by the first sensor, location information of the motor vehicle, and/or information from a navigation map.

In some aspects, the method can further include approving one or more drivable areas within the route using the stored data associated with the object and using the approved one or more drivable areas to autonomously or substantially autonomously drive the motor vehicle. Additionally, or alternatively, the method can include communicating the approved one or more drivable areas to a driver of the motor vehicle.

In some aspects, the displaying the object can include displaying the object as a 3-dimensional (3D) object in the AR mode, the augmented virtual reality hybrid mode, or the VR mode. In some aspects, the method can further include displaying the route driven by the motor vehicle in the AR mode, the augmented virtual reality hybrid mode, or the VR mode. Additionally, or alternatively, the method can include communicating VR information associated with the route driven by the motor vehicle to a computing device for displaying on a gaming console, to be used in an interactive game, or to display, or to display the information captured by the sensor.

In some aspects, the method can further include capturing, using the sensor, data associated with a second object of the route driven by the motor vehicle and capturing, using a second sensor, environmental data associated with the route. The method can further include determining, using the processor, the second object based on the captured data and determining, using the processor, whether the determined second object is a static object or a dynamic object. In response to determining that the determined second object is a static object, the method can further include storing, in the memory, the second object and the data associated with the second object.

In some aspects, the data associated with the second object of the route driven by the motor vehicle is captured during a first time period. The method can further include capturing a second set of data associated with the second object of the route driven by the motor vehicle during a second time period different from the first time period and updating the stored data associated with the second object based on the captured second set of data.

In some aspects, storing the static object and the data associated with the static object can include storing the static object and the data associated with the static object in the memory based on the captured information associated with the route driven by the motor vehicle. The captured information can include location information associated with one or more landmarks captured by the first sensor, location information of the motor vehicle, and/or information from a navigation map.

In some aspects, the determining the second object can include determining the second object based on the captured data and the captured environmental data.

In some aspects, the method can further include receiving, from a remote computing device, additional data associated with the static object and storing, in the memory, the additional data.

In some aspects, storing the static object and the data associated with the static object can include storing the static object and the data associated with the static object in the memory in the motor vehicle. Additionally, or alternatively, storing the static object and the data associated with the static object can include storing the static object and the data associated with the static object in the memory outside of the motor vehicle.

Some aspects of this disclosure relate to a system including a sensor configured to capture information associated with a route driven by a motor vehicle. The system can further include a processor communicatively coupled to the sensor and configured to determine, using the captured information, whether an object associated with the route and data associated with the object are stored in a memory. The processor can be further configured to access the memory based on the captured information, where the captured information comprises location information associated with one or more landmarks captured by the sensor, location information of the motor vehicle, or information from a navigation map. In response to determining that the object is stored in the memory, the processor can be configured to display the object in an augmented reality mode (AR) mode, an augmented virtual reality hybrid mode, or a virtual reality (VR) mode using the stored data associated with the object Some aspects of this disclosure relate to a non-transitory computer-readable medium storing instructions that when executed by a processor of a system, cause the system to perform operations including capturing, using a sensor of the system, information associated with a route driven by a motor vehicle. The operations can further include determining, using the captured information, whether an object associated with the route and data associated with the object are stored in a memory. In response to determining that the object is stored in the memory, the operations can further include displaying the object in an augmented reality mode (AR) mode, an augmented virtual reality hybrid mode, or a virtual reality (VR) mode using the stored data associated with the object.

This Summary is provided for purposes of illustrating some aspects of this disclosure to provide an understanding of the subject matter described herein. Accordingly, the above-described features are examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
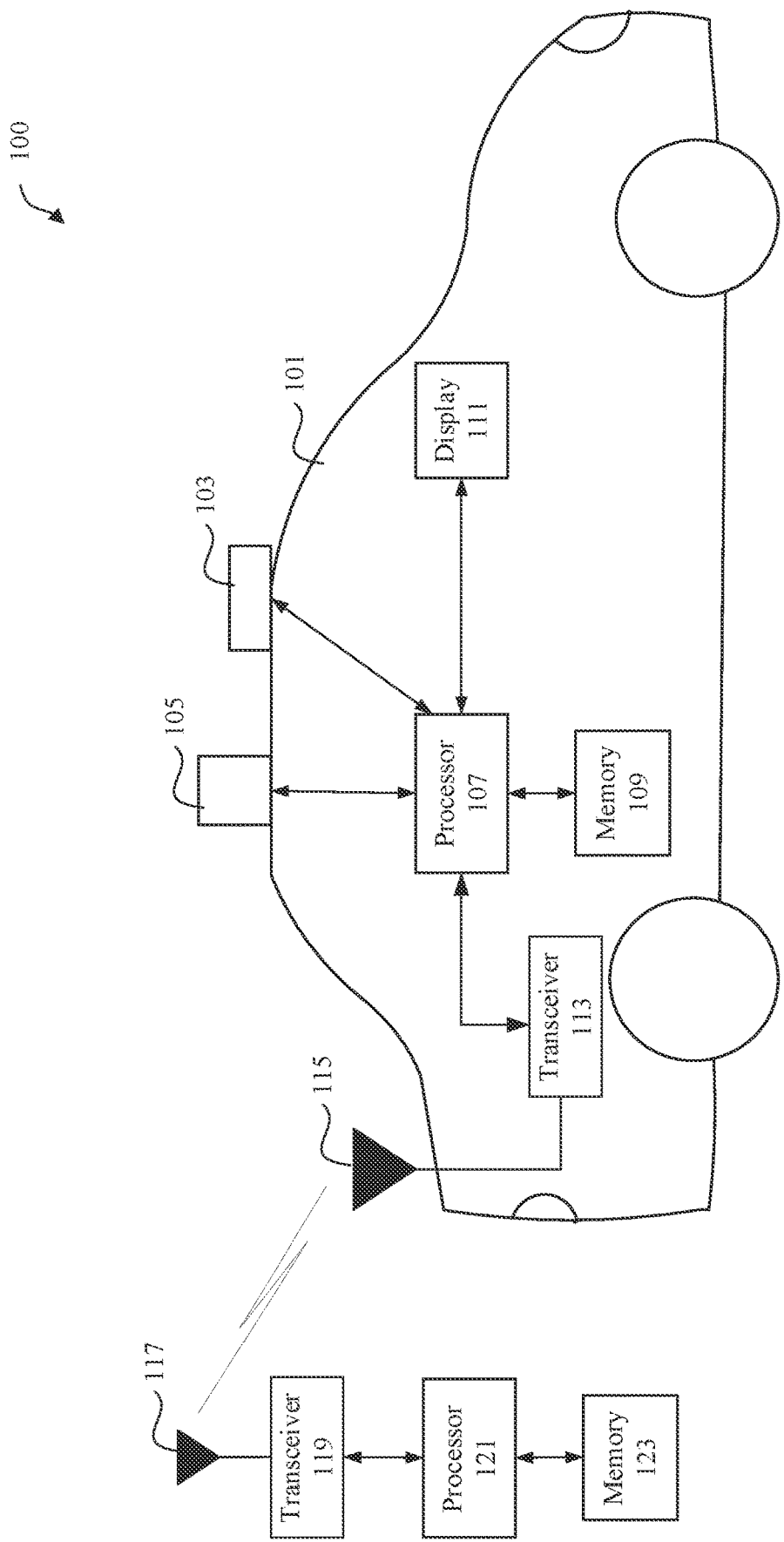
FIG. 1 illustrates an example system implementing driving assistance mechanisms, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for detecting objects along a driving route and/or a driving area, storing the objects and/or information associated with the detected objects, and using the stored objects and their information to assist the driver of a motor vehicle (and/or for automated driving of the motor vehicle) when the motor vehicle is driven along the same driving area or a part of the same driving area. According to some aspects, new trips, new driving routes, and/or new driving areas that intersect the previously stored driving routes and/or driving area can use the stored information associated with the previously stored driving routes and/or driving areas. According to some aspects, the stored objects and their information can be updated each time the motor vehicle is driving along the same driving route, the same driving area, or a part of the same driving area. The stored objects and their information can be route specific and can be specifically stored for each route through such area.

According to some aspects, the stored objects and their information can be used as an independent redundant sensor information in addition to other information captured by the sensor(s) of the motor vehicle when the motor vehicle is driven along the route. According to some aspects, the stored information can be used to generate an augmented reality (AR), an augmented virtual reality hybrid, and/or a purely virtual reality (VR) mode that can be displayed to the driver of the motor vehicle to further assist the driver. In some examples, the stored information can be sent to a remote computing device to be used in, for example, a gaming system using AR, augmented virtual reality hybrid, and/or purely VR.

FIG. 1 illustrates an example system 100 implementing driving assistance mechanisms, according to some aspects of the disclosure. Example system 100 is provided for the purpose of illustration only and does not limit the disclosed aspects. System 100 may include, but is not limited to, one or more sensors 103, one or more Global Positioning Systems (GPS) receivers 105, processor 107, memory 109, display 111, transceiver 113, and antenna 115. According to some aspects, sensors 103, GPS receivers 105, processor 107, memory 109, display 111, transceiver 113, and antenna 115 can be within and/or coupled to (e.g., internal to) motor vehicle 101. System 100 can further include transceiver 119, processor 121, and memory 123 that can be external to motor vehicle 101.

According to some aspects, when motor vehicle 101 is driven on a route, sensor 103 can be configured to capture one or more objects and information associated with these objects that are along the route. These objects can include, but are not limited to, one or more of landmarks, bridges, traffic signs, traffic lights, pedestrian crossings, critical curve radius, school areas, curbs, traffic islands, drivable areas, type of shoulder (soft, hard, dangerous), railway crossing, traffic median, roundabout, traffic circle, pot holes, lane markers, or the like.

Although one sensor 103 is illustrated in FIG. 1, the aspects of this disclosure can include any number of sensors. The sensor 103 can include, but is not limited to, one or more of a camera, a radar, a lidar, an ultrasonic sensor, or the like. sensor 103 can be configured to capture one or more objects and information associated with these objects that are along the route. Additionally, or alternatively, sensor 103 can include environmental sensors configured to capture environmental data associated with the route. The environmental sensors can include, but are not limited to, sensors configured to measure, monitor, and or record environmental parameters such as temperature, light, heat, humidity, or the like. Additionally, or alternatively, sensor 103 can include sensors configured to measure parameters associated with motor vehicle 101 such as, but not limited to, speed, acceleration, deceleration, or the like. In certain aspects, sensors may receive data from the direction of travel, to the side of the direction of travel, or from the direction opposite to the direction of travel.

According to some aspects, after the object and/or the information associated with the objects are captured by sensor 103, the captured information can be transmitted to processor 107. In some examples, processor 107 can be configured to analyze the captured information to determine what object was captured by sensor 103. For example, sensor 103 can include a camera that captures one or more images of a traffic sign. The captured images can be sent to processor 107. Processor 107 can be configured to analyze the captured images to determine the traffic sign. According to some aspects, processor 107 can use different mechanisms to determine the object (and associated information) from the captured information by sensor 103. The mechanisms to determine the object (and associated information) can include artificial intelligent algorithms, machine learning algorithms, or the like. In some examples, processor 107 can use semantic segmentation to determine different objects (and their associated information) from the information captured by sensor 103. According to some aspects, the semantic segmentation is performed in real time (or substantially real time) by processor 107. The data extracted after the semantic segmentation is stored in memory 109 and/or memory 123.

According to some aspects, processor 107 can use information captured by one or more sensors to determine what object was captured. For example, processor 107 can use captured images of the object with environmental data captured by an environmental sensor to determine object was captured.

According to some aspects, processor 107 can store the captured object and its associated information in memory 109. In some examples, processor 107 can store the captured object and its associated information in memory 109 based on the location of the object and/or the location of motor vehicle 101. Therefore, system 100 can have the objects (and their associated information) stored in memory 109 based on the location of the objects. And when needed, the object (and their associated information) can be retrieved based on a detected location of motor vehicle 101.

According to some aspects, the location of the object and/or motor vehicle 101 can be determined using one or more of GPS data, a navigation map and/or locations of landmarks. In some examples, the GPS data can be determined using GPS receiver 105. In some examples, the navigation map can be accessed using processer 107 internally, externally, or a combination thereof. In some examples, the locations of landmarks can be determined from, for example, sensor 103.

According to some aspects, in addition to, or alternative to, storing the captured object and its associated information in internal memory 109, processor 107 can store the captured object and its associated information in external memory 123. For example, processor 107 can use transceiver 113 and antenna 115 to transmit the captured object and its associated information. Transceiver 119 and antenna 117 can receive the captured object and its associated information. Processor 121 can store the captured object and its associated information in memory 123.

According to some aspects, before storing the captured object and its associated information, processor 107 can determine whether the object is a static object or a dynamic object. In some examples, the static objects can include objects that do not move. For example, the static objects can include one or more of landmarks, bridges, traffic signs, traffic lights, pedestrian crossings, critical curve radius, school areas, curbs, traffic islands, drivable areas, type of shoulder (soft, hard, dangerous), railway crossing, traffic median, roundabout, traffic circle, pot holes, lane markers, or the like. In some examples, the dynamic objects can include object that can move. For example, the dynamic objects can include other motor vehicles, pedestrians, animals, or the like.

According to some aspects, after determining the object in the driving route, processor 107 can be configured to determine whether the object is a static object or a dynamic object. In one example, processor 107 can access a list of objects stored in memory 109 and/or memory 123, compare the determined object with the list of objects, and based on the comparison determine whether the object is static or dynamic. Additionally, or alternatively, when motor vehicle 101 is driven over the same route, the same driving area, or a part of the same driving area multiple times, processor 101 can determine whether the object has a corresponding stored object that was captured and stored in previous drives over the same route and/or same driving area. If the corresponding stored object exists, processor 107 can determine that the object is a static object. If the corresponding stored object does not exist, processor 107 can determine that the object may be a dynamic object.

According to some aspects, after determining the object and after determining that the object is a static object, processor 107 can store the captured object and its associated information in memory 109 and/or memory 123.

Additionally, or alternatively, processor 107 can be configured to receive information about objects in the driving route from one or more other sources. For example, processor 107 can receive information about objects in the driving route from external servers, from external databases, from navigation systems, from the objects in the route, or the like. Processor 107 can be configured to store the received information in addition to (or in alternate to) the information that processor 107 can measure or calculate from sensor 103.

According to some aspects, system 100 can repeat the methods discussed above a number of times for each route when motor vehicle 101 is driven at that route. Each time that motor vehicle 101 is driven at that route, the stored data associated with that route can be updated. In certain aspects, the updating can include storing additional information such as the time of the drive of the route when an object is determined, and/or the number of times a particular object has been confirmed. Such additional information may be used to provide degree of confidence information concerning the presence of an object in certain aspects. In other aspects, the additional information may be used to determine that an object has been removed or no longer exists on a particular route. For example, should a route have been driven several times, and the object is no longer determined to be present over these drives, the object may be removed from the stored data. For an object to be removed, in some aspects, the number of drives revealing an absence of the object may be a predetermined number of drives. In other aspects, the time when an object was last confirmed in its location may be used to assess the confidence in this object data. For example, object data that is considered stale (e.g., date of last confirmation is prior to a particular time, such as a predetermined time prior to the current drive) and may be disregarded and/or removed from the stored data.

Although one GPS receiver 105 is illustrated in FIG. 1, the aspects of this disclosure can include any number of GPS receivers. According to some aspects, GPS receiver 105 can include a Differential Global Positioning System (DGPS). Additionally, or alternatively, GPS receiver 105 can include other receivers configured to gather data that can be used to determine the location of motor vehicle 101. According to other aspects, global navigation satellite systems (GNSS) other than the United States' GPS system may be used, such as Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. When other GNSS systems are used, compatible receivers are used in place of GPS receiver 105. According to some other aspects, locations systems such as certain wireless systems (such as cellular wireless and/or Wireless Local Area Network, e.g., WiFi) may be used to supply location information, or to assist in the supply of location information. Such systems may be useful in routes that are partially underground or partially include tunnels. Again, when such systems are used, compatible receivers are used in place of, or in addition, to GPS receiver 105.

According to some aspects, memory 109 and/or memory 123 may include random access memory (RAM) and/or cache, and may include control logic (e.g., computer software) and/or data. Memory 109 and/or memory 123 may include other storage devices or memory such as, but not limited to, a hard disk drive and/or a removable storage device/unit.

According to some aspects, transceiver 113 and/or transceiver 119 can include low-power subsystem, a cellular subsystem, a Wireless Local Area Network (WLAN) subsystem, and/or a Bluetooth® subsystem, each including its own radio transceiver and protocol(s) as will be understood by those skilled arts based on the discussion provided herein. In some implementations, transceiver 113 and/or transceiver 119 can include more or fewer systems for communicating with other devices. In some examples, transceiver 113 and/or transceiver 119 can include processors, controllers, radios, sockets, plugs, buffers, and like circuits/devices used for connecting to and communication on networks. According to some examples, transceivers 113 and/or transceiver 119 includes one or more circuits to connect to and communicate on wired and/or wireless networks.

According to some aspects, antenna 115 and/or antenna 117 may include one or more antennas that may be the same or different types.

According to some aspects, the stored information associated with the route driven by motor vehicle 101 can be used to assist the driver of motor vehicle 101 and/or can be used for automated driving of motor vehicle 101 when the motor vehicle 101 is driven on that route. As discussed in more detail below, processor 107 can determine that motor vehicle 101 is being driven on a route. Processor 107 can further determine that information associated with route is stored in memory 109 and/or memory 123. Processor 107 can retrieve the stored information to assist the driver of motor vehicle 101 and/or to use for automated driving of motor vehicle 101 when the motor vehicle 101 is driven on that route.

In one example, processor 107 can use the retrieved stored information for an autonomous driving level 3 of motor vehicle 101. For example, processor 107 can use the retrieved stored information as an independent redundant sensor information in addition to other information captured by the sensor(s) of the motor vehicle when the motor vehicle is driven along the route. For example, processor 107 can use the retrieved stored information to approve, release, and/or validate drivable areas for motor vehicle 101. In some examples, approving (or releasing or validating) a drivable area for motor vehicle 101 can include using the stored information associated with the route (and/or the area) and information associated with motor vehicle 101 (e.g., the length, the height, the weight, etc. of motor vehicle 101) to determine whether motor vehicle 101 can drive on the route (and/or the area). In some examples, approving (or releasing or validating) a drivable area for motor vehicle 101 can include using the stored information associated with the route (and/or the area) to determine what part(s) of the route (and/or the area) are drivable and what part(s) of the route (and/or the area) are not drivable.

In another example, processor 107 can use the retrieved stored information for assisting the driver of motor vehicle 101 to drive motor vehicle 101 on the route. For example, because of environmental conditions (e.g., weather conditions, the angle to the sun, time of day, or the like), the driving conditions may be degraded and the data captured by sensors 103 may have less quality than usual. Then, processor 107 can use the retrieved stored information for assisting the driver of motor vehicle 101 to drive motor vehicle 101 on the route in these conditions. In some examples, processor 107 can use the retrieved stored information to generate an AR mode, an augmented virtual reality hybrid mode, and/or a purely VR mode. Processor 107 can use display 111 to display the objects of the route (using the retrieved stored information) to the driver in the AR mode, the augmented virtual reality hybrid mode, and/or the purely VR mode.

According to some aspects, the AR mode, the augmented virtual reality hybrid mode, and/or the purely VR mode (herein referred to as VR throughout the rest of the disclosure) displayed using display 111 can include a 3 dimensional (3D) rendering of the objects on the route. In a non-limiting example, the route can include one or more traffic signs. These traffic signs and their associated information are stored in memory 109 and/or memory 123. When processor 107 determines that motor vehicle 101 is being driven in the route, processor 107 can display the traffic signs (e.g., as rendered 3D objects) in the VR mode on display 111 to the driver at correct locations of the traffic signs. Therefore, if because of environmental conditions the driver cannot clearly see the physical traffic signs, the VR mode on display 111 can clearly show these signs to the driver.

In another non-limiting example, processor 107 can display objects that are not yet visible by the driver on the VR mode on display 111. For example, if a traffic sign is after a curve and is hidden behind a building, processor 107 by knowing the location of the traffic sign, the location of motor vehicle 101, and locations of other objects on the route, can display the traffic sign in the VR mode on display 111. For example, processor 107 can augment the traffic sign in dashed line (or other methods) on display 111 to let the driver know the existence of the sign and its location corresponding to the route. In certain aspects, processor 107 can display objects based on the direction of travel, as well as one or more of the preceding information.

In some examples, the VR mode on display 111 can include the 3D rendering of the objects on the route. In some examples, the VR mode on display 111 can include 3D rendering of a virtual object corresponding to the objects on the route. In some examples, display 111 can include, but is not limited to, one or more of a display of user equipment (UE) used by the driver, an entertainment system, a head-up display (HUD), a head-mounted display (HMD), or the like.

In addition to displaying the VR mode of the objects on display 111, processor 107 can transmits the VR rendering to, for example, processor 121. In a non-limiting example, processor 121 can use the VR rendering for gaming (e.g., to display on a gaming console). In some examples, the gaming can be a real-time or substantially real-time gaming and/or an interactive gaming. The gaming console can include, but is not limited to, one or more of a display of a UE used by the driver, an entertainment system, a head-mounted display (HMD), or the like. According to some aspect, the object on the route (and/or in an area) can be considered assets that are used in VR mode and/or VR gaming. In some examples, the semantic segmentation is to determine the objects (and their associated information) from the information captured by sensor 103 in a field of play in the VR mode and/or the VR gaming.

According to some aspects, whether the VR rendering is on display 111 or on a gaming console in or outside motor vehicle 101, the VR rendering can be done using a human-machine interface (HMI). Therefore, a driver (or a passenger) of motor vehicle 101 and/or a user of a gaming system can see the identified objects (e.g., assets) in a virtual environment on display 111 and/or on the gaming console. In some examples, the VR rendering of the route (or the area) can increase the driver's trust in, for example, the automated driving of motor vehicle 101. According to some examples, the VR rendering of the route (or the area) can display, on display 111, the data captured by the sensors (e.g., sensor 103) of motor vehicle 101 form the route (or the area). In other words, the VR rendering of the route (or the area) can display, on display 111, what the sensors (e.g., sensor 103) of motor vehicle 101 "see" (e.g., capture) form the route (or the area).

According to some aspects, and as discussed above, processor 107 can determine that motor vehicle 101 is being driven on a route and processor 107 can further determine that information associated with route is stored in memory 109 and/or memory 123. In one example, processor 107 can determine the route that motor vehicle 101 is driving on and whether information associated with the route is stored in memory 109 and/or memory 123 based on location information associated with one or more landmarks captured by sensor 103, location information of motor vehicle 101, and/or information from a navigation map.

For example, based on a starting point and a destination point entered in the navigation system, processor 107 can determine the route and determine whether information associated with route is stored in memory 109 and/or memory 123. Information associated with the route can include objects (e.g., static objects) in the route and information associated with these objects. In another example, based on the location information of motor vehicle 101 from, for example, GPS receiver 105, processor 107 can determine the route and determine whether information associated with route is stored in memory 109 and/or memory 123.

Yet in another example, sensor 105 can capture information (e.g., actual/live information during the movement of motor vehicle 101) from the route. The captured actual information can include objects in the route and information associated with these objects. Processor 107 can compare the captured actual information with the stored information in memory 109 and/or memory 123 to determine whether stored information corresponding to the actual information exist. For example, processor 107 can determine whether one or more stored objects (and their associated information) exist that correspond to the captured actual objects.

If the one or more stored objects (and their associated information) do not exist, processor 107 can determine the actual objects and store them (with their associated information) in memory 109 and/or memory 123 as discussed above.

If the one or more stored objects (and their associated information) exist, processor 107 can use the actual objects (and their associated information) to update the stored objects in memory 109 and/or memory 123 as discussed above. Additionally, processor 107 can use the stored objects (and their associated information) to generate and display the VR using 3D rendering of the stored object. Processor 107 can access memory 109 and/or memory 123 to retrieve the stored objects for displaying them. Processor 107 can access memory 109 and/or memory 123 based on the location information associated with one or more landmarks captured by sensor 103, location information of motor vehicle 101, and/or information from the navigation map.

In some examples, processor 107 can access memory 109 and/or memory 123 in real time (or substantially real time) to retrieve the stored objects for displaying them in real time (or substantially real time). Additionally, or alternatively, processor 107 can access memory 109 and/or memory 123 to retrieve the stored objects in advance of displaying the stored objects. In a non-limiting example, if processor 107 identifies the route being driven (e.g., based on starting point and destination point from a navigation system), processor 107 can access memory 109 and/or memory 123 to retrieve the stored objects in advance.

Figure 2:
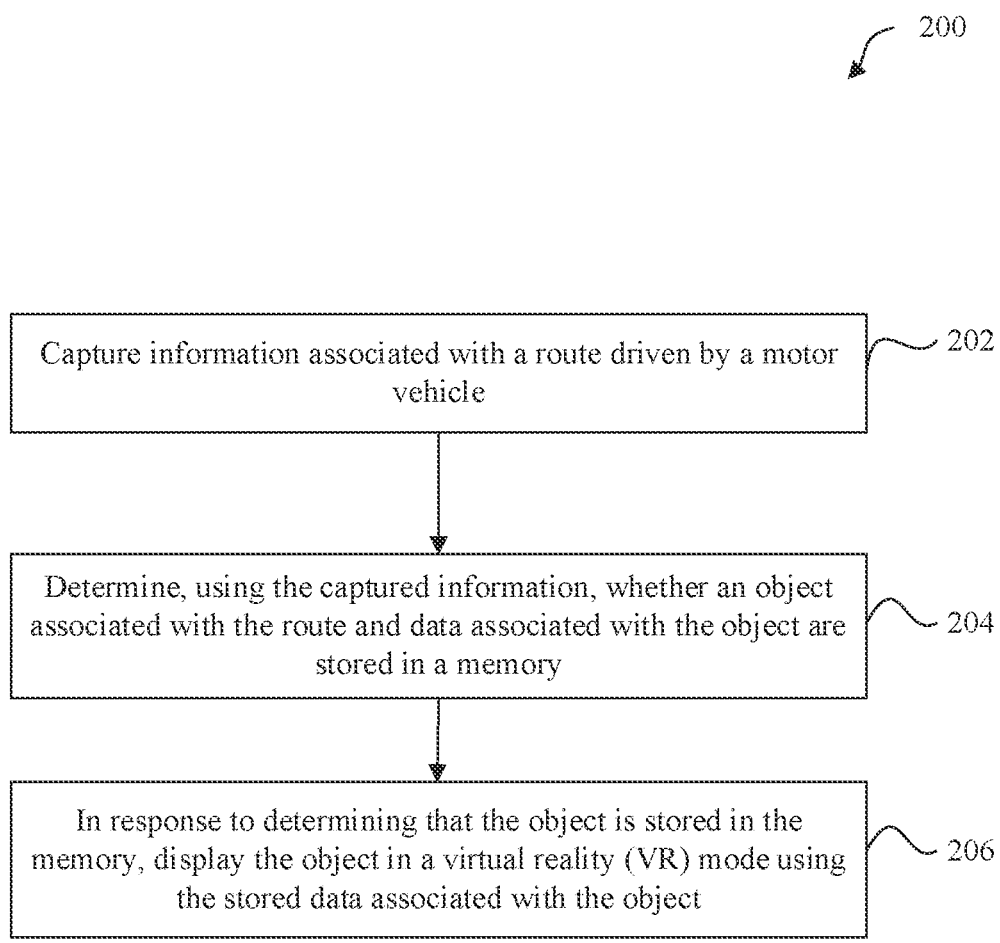
FIG. 2 illustrates an example method for using stored information for implementing driving assistance mechanisms, according to some aspects of the disclosure.

FIG. 2 illustrates an example method 200 for using stored information for implementing driving assistance mechanisms, according to some aspects of the disclosure. As a convenience and not a limitation, FIG. 2 may be described with regard to elements of FIG. 1. Method 200 may represent the operation of a system (e.g., system 100 of FIG. 1) implementing mechanisms for using stored information for driving assistance. Method 200 may also be performed by computer system 400 of FIG. 4. But method 200 is not limited to the specific aspects depicted in those figures and other systems may be used to perform the method as will be understood by those skilled in the art. It is to be appreciated that not all operations may be needed, and the operations may not be performed in the same order as shown in FIG. 2.

At 202, information associated with a route driven by a motor vehicle is captured. For example, sensor 103 can be configured to capture the information associated with the route. According to some aspects, the information associated with the route can include information associated with one or more objects of the route that is being driven by the motor vehicle. Additionally, or alternatively, the information associated with the route can include location information associated with one or more landmarks captured by sensor 103, location information of the motor vehicle, information from a navigation map, or the like. The captured information can be used by, for example, system 100 of FIG. 1 to assist the driver of the motor vehicle and/or can be used for automated driving of the motor vehicle. Additionally, or alternatively, the captured information can be used by, for example, system 100 of FIG. 1 to determine whether stored information for the one or more objects of the route exists (in, for example, memory 109 and/or memory 123) such the stored information can be used to enhance driving assistance.

At 204, it is determined whether an object associated with the route and data associated with the object are stored in a memory. For example, processor 107 of FIG. 1 can use the captured information to determine whether one or more objects associated with route (and their associated information) are stored in memory 109 and/or memory 123. In a non-limiting example, sensor 105 can capture images (e.g., actual/live images during the movement of the motor vehicle) from the route. The captured actual images can include images of one or more objects in the route (and information associated with these objects). Processor 107 can compare the captured actual images with the stored images in memory 109 and/or memory 123 to determine whether stored information corresponding to the actual information exist. For example, processor 107 can determine whether one or more stored objects (and their associated information) exist that correspond to the captured actual objects.

According to some aspects, operation 204 can include determining whether an actual object of the route captured by sensor 103 is the same as or substantially the same as the object stored in memory 109 and/or memory 123. According to some aspects, determining whether an actual object of the route captured by sensor 103 is the same as or substantially the same as the object stored in memory 109 and/or memory 123, information associated with the actual object can be compared to information associated with the stored object. If a difference between the information associated with the actual object and the information associated with the stored object satisfies a condition (e.g., being less than a threshold), it can be determined that the actual object is substantially the same (or is the same) as the stored object. Additionally, or alternatively, one or more metrics can be determined for the actual object and the stored object. If a difference between the metric(s) of the actual object and the metric(s) of the stored object satisfies a condition (e.g., being less than a threshold), it can be determined that the actual object is substantially the same (or is the same) as the stored object.

According to some aspects, method 200 and/or operation 204 can further include accessing memory 109 and/or memory 123 based on the captured information from the route that the motor vehicle is driving on. Processor 107 can access memory 109 and/or memory 123 to determine whether the stored information exists and to retrieve the stored information. In some examples, the captured information from the route can include, but is not limited to, location information associated with one or more landmarks captured by sensor 103, location information of the motor vehicle, information from a navigation map, or the like.

At 206, in response to determining that one or more objects are stored in the memory, the objects are displayed in a virtual reality (VR) mode using the stored data associated with the objects. For example, when processor 107 determines that the motor vehicle has driven on the route before and one or more objects (and their associated information) are stored in memory 109 and/or memory 123, processor 107 can use the stored information to generate a VR mode driving emulation. According to some aspects, the stored objects and/or stored data associated with the objects are 3D objects (and include 3D data).

According to some aspects, method 200 can further include displaying the route driven by the motor vehicle in the VR mode on display 111. Additionally, or alternatively, method 200 can further include communicating VR information associated with the route driven by the motor vehicle to a computing device for displaying in, for example, a gaming console. Yet, additionally, or alternatively, method 200 can further include using the stored information (which are retrieved by, for example, processor 107) for autonomously or substantially autonomously drive of the motor vehicle. For example, method 200 can include approving (and/or releasing or validating) one or more drivable areas within the route using the stored data associated with the object and using the approved one or more drivable areas to autonomously or substantially autonomously drive the motor vehicle. In some examples, method 200 can include approving (and/or releasing or validating) one or more drivable areas within the route using the stored data associated with the object and communicating the approved one or more drivable areas to a driver of the motor vehicle.

Figure 3:
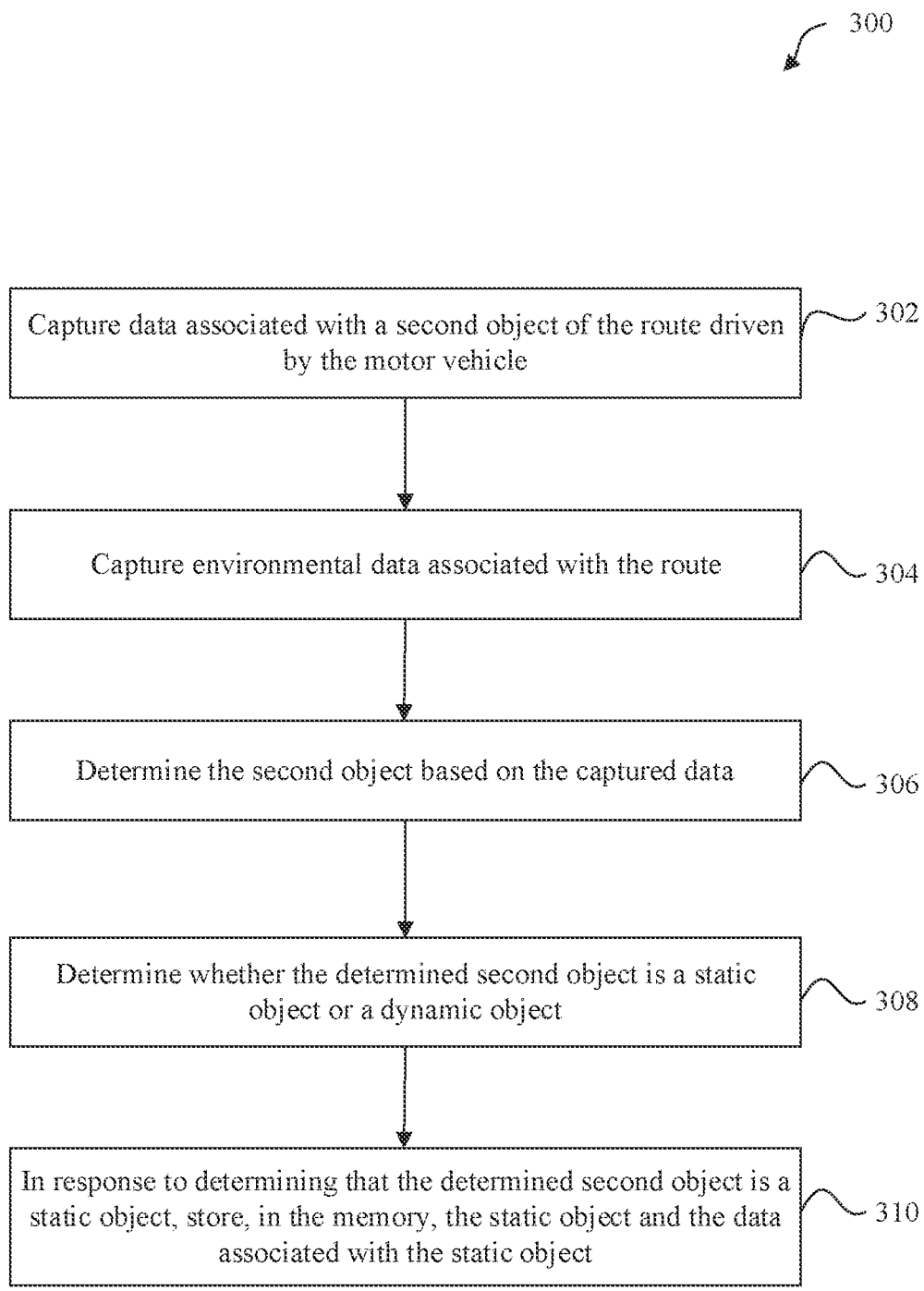
FIG. 3 illustrates an example method for gathering, storing, and updating information for implementing driving assistance mechanisms, according to some aspects of the disclosure.

FIG. 3 illustrates an example method 300 for gathering, storing, and updating information for implementing driving assistance mechanisms, according to some aspects of the disclosure. As a convenience and not a limitation, FIG. 3 may be described with regard to elements of FIGS. 1 and 2. Method 300 may represent the operation of a system (e.g., system 100 of FIG. 1) implementing mechanisms for gathering, storing, and updating information for implementing driving assistance mechanisms. Method 300 may also be performed by computer system 400 of FIG. 4. But method 300 is not limited to the specific aspects depicted in those figures and other systems may be used to perform the method as will be understood by those skilled in the art. It is to be appreciated that not all operations may be needed, and the operations may not be performed in the same order as shown in FIG. 3.

According to some aspects, method 300 can be performed before method 200 to, for example, gather and store information associated with a route that the motor vehicle is driven on. Additionally, or alternatively, method 300 can be performed along with method 200 to, for example, gather, store, and update information associated with the route that the motor vehicle is driven on. For example, at 302, data associated with a second object of the route driven by the motor vehicle is captured. For example, sensor 103 can be configured to capture data and information associated with the second object of the route while the motor vehicle is driven on the route.

At an optional operation 304, environmental data associated with the route can also be captured. For example, one or more environmental sensors of system 100 of FIG. 1 can be configured to capture the environmental data associated with the route.

At 306, the second object can be determined. For example, processor 107 can use one or more of captured data associated with the second object or the environmental data to determine what the second object is. In a non-limiting example, the captured data can include images of the second object. Using these images (and/or the captured environmental data), processor 107 can determine the second object.

At 308, it is determined whether the determined second object is a static object or a dynamic object. For example, processor 107 can use different mechanisms discussed above to determine whether the second object is a static object or a dynamic object. In one example, processor 107 can access a list of objects stored in memory 109 and/or memory 123, compare the determined second object with the list of objects, and based on the comparison determine whether the second object is static or dynamic. Additionally, or alternatively, when motor vehicle 101 is driven over the same route, the same driving area, or a part of the same driving area multiple times, processor 101 can determine whether the second object has a corresponding stored object that was captured and stored in previous drives over the same route and/or same driving area. If the corresponding stored object exists, processor 107 can determine that the second object is a static object. If the corresponding stored object does not exist, processor 107 can determine that the object may be a dynamic object.

If processor 107 determines that the second object is a dynamic object (e.g., a pedestrian, another motor vehicle, an animal, etc.), method 300 can move back to operation 302. However, in response to determining that the determined second object is a static object, method 300 can move to operation 310. At 310, the second object and the data associated with the second object can be stored in memory 109 and/or memory 123.

Additionally, or alternatively, if the second object (and its associated information/data) already exists in memory 109 and/or memory 123, operation 310 can include updating the stored second object (and its associated information/data). In other words, the data associated with the second object of the route driven by the motor vehicle could have been captured during a first time period and method 300 can include capturing a second set of data associated with the second object of the route driven by the motor vehicle during a second time period different from the first time period and updating the stored data associated with the second object based on the captured second set of data.

According to some aspects, updating the stored second object (and its associated information/data) can be based on (e.g., depend on) captured environmental data. For example, associated environmental data for the stored second object (and its associated information/data) can indicate the environmental condition under which the second object (and its associated information/data) was detected and stored. In a non-limiting example, the stored second object (and its associated information/data) was detected and stored during the first time period when the environmental condition was good (e.g., no rain, no snow, no fog, etc.). During the second time period, if the environmental condition has degraded, processor 107 may not use the detected second object (and its associated information/data) to update the stored information. On the other hand, and in another non-limiting example, the stored second object (and its associated information/data) was detected and stored during the first time period when the environmental condition was not good (e.g., rain, snow, fog, night time, etc.). During the second time period, if the environmental condition has improved, processor 107 may use the detected second object (and its associated information/data) to update the stored information According to some aspects, operation 310 (either the first time storing or updating the stored information) can include storing the static object and the data associated with the static object in memory 109 and/or memory 123 based on the captured data/information associated with the route driven by the motor vehicle. The captured data can include, but is not limited to, location information associated with one or more landmarks captured by sensor 103, location information of the motor vehicle, information from a navigation map, or the like. For example, the object (and the data associated with the object) are indexed and stored in memory 109 and/or memory 123 based on location information associated with one or more landmarks captured by sensor 103, location information of the motor vehicle, information from a navigation map, or the like.

In addition to using the data captured by one or more sensors of the motor vehicle, system 100 can use data from other sources to determine objects and store (or update) the objects in memory 109 and/or memory 123. For example, method 300 can further include receiving, from a remote computing device (e.g., processor 121 through transceivers 119 and 113 and antennas 117 and 115) additional data associated with the static object and storing the additional data in memory 109 and/or memory 123. In a non-limiting example, constructions sites on the route driven by the motor vehicle can be captured and measured using one or more sensors 103 of the motor vehicle. The information associated with the constructions sites can be stored in memory 109 and/or memory 123, although the information can change. Additionally, system 100 can receive information regarding the constructions site from other sources (e.g., other motor vehicles, the construction sites, a navigation system/map, etc.) System 100 can use the received information to store and/or update stored information for the constructions sites. In other words, system 100 can use crowdsourcing to store (and/or update stored) information about the objects of the route.

Some aspects of this disclosure can emulate a real driver. For example, the more a human driver drives the same route, the same driving area, or a part of the same driving area the more the driver is able to recognize the route. The driver would be able to drive more securely because the driver is more familiar with the object of the route (e.g., traffic lights, traffic signs, critical curves, or the like). Some aspects of this disclosure can provide similar advantages. The more often a specific route is driven under different conditions, more and more details of the route are stored in the memory. After a number of times driving the same route, the same driving area, or a part of the same driving area, the virtual reality can be used as an additional redundant sensor for the advanced driver assistance system. In a non-liming example, some aspects of this disclosure can be applied to a "home to work" and/or "work to home" driving route or driving area. In these examples, the more often the "home to work" and/or "work to home" driving route or driving area is driven under different conditions, more and more details of the route are stored in the memory. Additionally, the aspects of this disclosure can use crowdsourcing to store (and/or update stored) information about the objects of a route or an area to be used by one or more motor vehicles. In some examples, the crowdsourcing can be used to store (and/or update stored) information in a cloud and/or one or memories accessible by a plurality of motor vehicles.

According to some aspects, new trips, new driving routes, and/or new driving areas that intersect the previously recorded driving routes and/or driving area can leverage the stored information associated with the previously recorded driving routes and/or driving areas. Additionally, or alternatively, the virtual reality mode may be used for autonomous driving (e.g., autonomous driving level 3).

Figure 4:
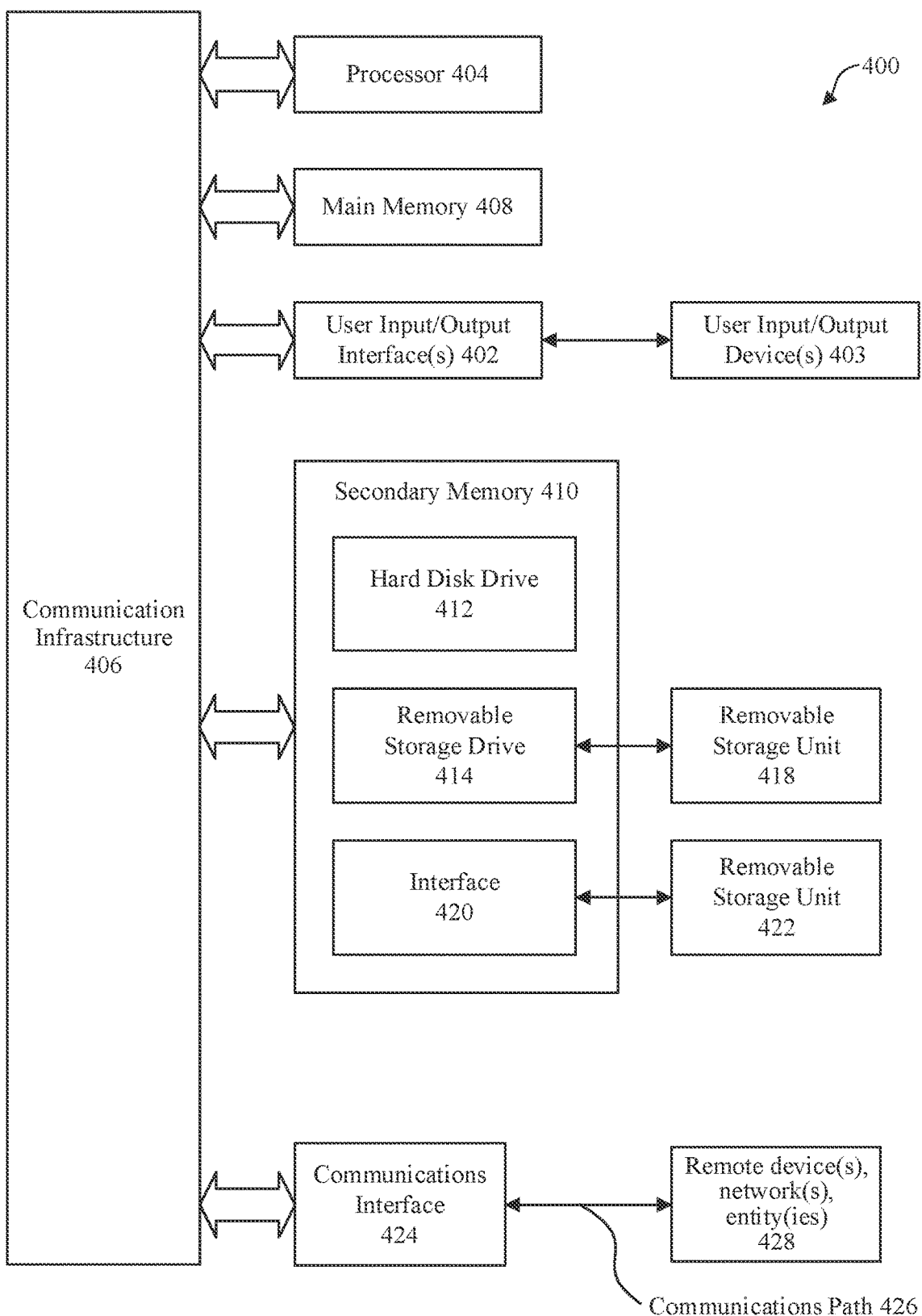
FIG. 4 illustrates an example computer system for implementing some aspects of the disclosure or portion(s) thereof.

Various aspects can be implemented, for example, using one or more computer systems, such as computer system 400 shown in FIG. 4. Computer system 400 can be a computer capable of performing the functions described herein such as system 100 of FIG. 1. Computer system 400 includes one or more processors (also called central processing units, or CPUs), such as a processor 404. Processor 404 is connected to a communication infrastructure 406 (e.g., a bus.) Computer system 400 also includes user input/output device(s) 403, such as monitors, keyboards, pointing devices, etc., that communicate with communication infrastructure 406 through user input/output interface(s) 402. Computer system 400 also includes a main or primary memory 408, such as random access memory (RAM). Main memory 408 may include one or more levels of cache. Main memory 408 has stored therein control logic (e.g., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to some aspects, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 400, main memory 408, secondary memory 410 and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 4. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "some aspects," "an example," "some examples" or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

What is claimed is:

1. A method, comprising:
capturing, using a sensor, information associated with a route driven by a motor vehicle;
determining, using a processor and the captured information, whether an object associated with the route and data associated with the object are stored in a memory;
in response to determining that the object is stored in the memory:
    determining that the motor vehicle has previously driven on the route;
    displaying the object in a virtual reality (VR) mode using the stored data associated with the object; and
    displaying, in the VR mode, one or more additional objects in the route that are not yet visible to a driver of the motor vehicle;
approving one or more drivable areas within the route using the stored data associated with the object;
using the approved one or more drivable areas to autonomously or substantially autonomously drive the motor vehicle;
capturing, using the sensor, data associated with a second object of the route driven by the motor vehicle;

determining, using the processor, whether the second object is a static object or a dynamic object;

in response to determining that the second object is a dynamic object, continuing capturing data associated with objects of the route without storing, in the memory, the second object and the data associated with the second object; and in response to determining that the second object is a static object, storing, in the memory, the second object and the data associated with the second object.

2. The method of claim 1, wherein the determining whether the object associated with the route and data associated with the object are stored in the memory comprises determining whether an actual object of the route captured by the sensor is substantially same as the object stored in the memory.

3. The method of claim 1, further comprising:
accessing the memory based on the captured information, wherein the captured information comprises location information associated with one or more landmarks captured by the sensor, location information of the motor vehicle, and/or information from a navigation map.

4. The method of claim 1, further comprising:
communicating the approved one or more drivable areas to the driver of the motor vehicle.

5. The method of claim 1, wherein the displaying the object comprises displaying the object as a 3-dimensional (3D) object in the VR mode.

6. The method of claim 1, further comprising:
displaying the route driven by the motor vehicle in the VR mode.

7. The method of claim 1, further comprising:
communicating VR information associated with the route driven by the motor vehicle to a computing device for displaying a gaming console, to be used in an interactive game, or to display the information captured by the sensor.

8. The method of claim 1, wherein the information associated with the route comprises location information associated with one or more landmarks captured by the sensor, location information of the motor vehicle, and/or information from a navigation map.

9. The method of claim 1, further comprising:
capturing, using a second sensor, environmental data associated with the route; and
determining, using the processor, the second object based on the captured data.

10. The method of claim 9, wherein the data associated with the second object of the route driven by the motor vehicle is captured during a first time period and the method further comprises:
capturing a second set of data associated with the second object of the route driven by the motor vehicle during a second time period different from the first time period; and
updating the stored data associated with the second object based on the captured second set of data and the environmental data associated with the route.

11. The method of claim 9, wherein:
storing the static object and the data associated with the static object comprises storing the static object and the data associated with the static object in the memory based on the captured information associated with the route driven by the motor vehicle, and
the captured information comprises location information associated with one or more landmarks captured by the sensor, location information of the motor vehicle, and/or information from a navigation map.

12. The method of claim 9, wherein the determining the second object further comprises determining the second object based on the captured data and the captured environmental data.

13. The method of claim 1, further comprising:
receiving, from a remote computing device, additional data associated with the static object; and
storing, in the memory, the additional data.

14. The method of claim 1, wherein storing the static object and the data associated with the static object comprises storing the static object and the data associated with the static object in the memory in the motor vehicle.

15. The method of claim 1, wherein storing the static object and the data associated with the static object comprises storing the static object and the data associated with the static object in the memory outside of the motor vehicle.

16. The method of claim 1, wherein the object comprises one or more of landmarks, bridges, traffic signs, traffic lights, pedestrian crossings, critical curve radius, school areas, curbs, traffic islands, drivable areas, type of shoulder, railway crossing, traffic median, roundabout, traffic circle, pot holes, or lane markers, wherein the type of shoulder includes one of soft, hard or dangerous.

17. The method of claim 1, wherein the sensor comprises one or more of a camera, radar, an ultrasonic sensor.

18. A system, comprising:
a sensor configured to capture information associated with a route driven by a motor vehicle; and
a processor communicatively coupled to the sensor and configured to:
determine, using the captured information, whether an object associated with the route and data associated with the object are stored in a memory;
access the memory based on the captured information, wherein the captured information comprises location information associated with one or more landmarks captured by the sensor, location information of the motor vehicle, or information from a navigation map;
in response to determining that the object is stored in the memory:
determine that the motor vehicle has previously driven on the route;
display the object in a virtual reality (VR) mode using the stored data associated with the object; and
display, in the VR mode, one or more additional objects in the route that are not yet visible to a driver of the motor vehicle;
approve one or more drivable areas within the route using the stored data associated with the object;
use the approved one or more drivable areas to autonomously or substantially autonomously drive the motor vehicle;
capture data associated with a second object of the route driven by the motor vehicle;
determine whether the second object is a static object or a dynamic object;
in response to determining that the second object is a dynamic object, continue capturing data associated with objects of the route without storing, in the memory, the second object and the data associated with the second object; and in response to determining that the second object is a static object, store, in the memory, the second object and the data associated with the second object.

19. A non-transitory computer-readable medium storing instructions that, when executed by a processor of a system, cause the system to perform operations comprising:

capturing, using a sensor of the system, information associated with a route driven by a motor vehicle;

determining, using the captured information, whether an object associated with the route and data associated with the object are stored in a memory;

in response to determining that the object is stored in the memory:

determining that the motor vehicle has previously driven on the route;

displaying the object in a virtual reality (VR) mode using the stored data associated with the object; and displaying, in the VR mode, one or more additional objects in the route that are not yet visible to a driver of the motor vehicle;

approving one or more drivable areas within the route using the stored data associated with the object;

using the approved one or more drivable areas to autonomously or substantially autonomously drive the motor vehicle;

capturing, using the sensor, data associated with a second object of the route driven by the motor vehicle;

determining, using the processor, whether the second object is a static object or a dynamic object; and in response to determining that the second object is a dynamic object, continuing capturing data associated with objects of the route without storing, in the memory, the second object and the data associated with the second object; and in response to determining that the second object is a static object, storing, in the memory, the second object and the data associated with the second object.

* * * * *